(12) United States Patent
Park et al.

(10) Patent No.: US 9,431,134 B1
(45) Date of Patent: Aug. 30, 2016

(54) STRUCTURE OF TOP NOZZLE FOR NUCLEAR FUEL ASSEMBLY

(75) Inventors: Nam-Gyu Park, Daejeon (KR);
Kyu-Tae Kim, Daejeon (KR);
Jung-Min Suh, Daejeon (KR);
Shin-Ho Lee, Daejeon (KR);
Kyong-Bo Eom, Daejeon (KR);
Joon-Kyoo Park, Daejeon (KR);
Jin-Sun Kim, Daejeon (KR);
Gyu-Cheol Shin, Daejeon (KR);
Seong-Ki Lee, Daejeon (KR); Il-Kyu Kim, Daejeon (KR); Ki-Sung Choi, Daejeon (KR); Kyeong-Lak Jeon, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 1279 days.

(21) Appl. No.: 13/585,446

(22) Filed: Aug. 14, 2012

Related U.S. Application Data

(63) Continuation-in-part of application No. 12/187,455, filed on Aug. 7, 2008, now abandoned.

(30) Foreign Application Priority Data

Mar. 14, 2008 (KR) .......................... 10-2008-0024071

(51) Int. Cl.
*G21C 15/00* (2006.01)
*G21C 3/33* (2006.01)

(52) U.S. Cl.
CPC ............... *G21C 3/3315* (2013.01); *G21C 3/33* (2013.01)

(58) Field of Classification Search
CPC ....... G21C 3/33; G21C 3/331; G21C 3/3315
USPC .......................................................... 376/353
See application file for complete search history.

(56) References Cited

U.S. PATENT DOCUMENTS

| | | | |
|---|---|---|---|
| 4,684,503 A * | 8/1987 | Shallenberger | ............... 376/446 |
| 4,687,630 A | 8/1987 | Gjertsen et al. | |
| 4,702,883 A | 10/1987 | Wilson et al. | |
| 5,844,958 A * | 12/1998 | Leroux et al. | ................ 376/446 |

FOREIGN PATENT DOCUMENTS

| | | | | |
|---|---|---|---|---|
| JP | 09311191 A | * 12/1997 | | ............... G21C 3/33 |
| KR | 10-2007-0086066 | 3/2009 | | |

* cited by examiner

*Primary Examiner* — Marshall O'Connor
(74) *Attorney, Agent, or Firm* — Rabin & Berdo, P.C.

(57) ABSTRACT

Disclosed herein is a joint structure between a top nozzle and a guide thimble. The joint structure includes an outer guide post, an inner-extension tube head, an inner-extension tube body, a wedge and the guide thimble. The outer guide post is provided with an external thread formed on a lower end thereof. The inner-extension tube head includes an annular retaining part formed on an upper end thereof. An internal thread is formed on a medial portion of the inner-extension tube head. An external thread is formed on each of upper and lower ends of the inner-extension tube body. A stop protrusion is provided under a lower end of the wedge. The wedge is welded to the inner-extension tube body after the top nozzle has been joined with the guide thimble. A stop protrusion receiving depression is formed in the guide thimble.

4 Claims, 9 Drawing Sheets

STRUCTURE OF TOP NOZZLE FOR NUCLEAR FUEL ASSEMBLY

CROSS-REFERENCE TO RELATED APPLICATIONS

This is a Continuation-in-part Application of U.S. application Ser. No. 12/187,455, filed on Aug. 7, 2008, which claims the benefit of priority from Korean Patent Application No. 10-2008-0024071, filed on Mar. 14, 2008, the disclosures of both of which are expressly incorporated by reference herein in their entireties.

BACKGROUND OF THE INVENTION

1. Field of the Invention

The present invention relates generally to joint structures between top nozzles and guide thimbles of nuclear fuel assemblies and, more particularly, to a joint structure between a top nozzle and a guide thimble which is configured such that an inner-extension tube is prevented from undesirably rotating when the top nozzle is separated from the nuclear fuel assembly, and assembly and disassembly between the top nozzle and the guide thimble is facilitated.

2. Description of the Related Art

A nuclear reactor refers to a device that is designed to exert artificial control over the chain reaction of the nuclear fission of fissile materials, thereby achieving a variety of purposes such as the generation of heat, the production of radioisotopes and plutonium, the formation of radiation fields, or the like.

Generally, enriched uranium that is obtained by raising the ratio of uranium-235 to a range between 2% and 5% is used in a light water nuclear reactor. The uranium is molded into a cylindrical pellet that weighs 5 g and processed into nuclear fuel that is used in a nuclear reactor. Numerous pellets are embedded into a cladding tube made of Zircaloy which is in a vacuum state. Thereafter, a spring and helium gas are put into the tube, and then a top end closure stopper is welded thereon, thereby making a fuel rod. A plurality of fuel rods constitutes a nuclear fuel assembly and is burned in a nuclear reactor by nuclear reaction.

FIG. 1 is a schematic view showing a general nuclear fuel assembly.

Referring to FIG. 1, the nuclear fuel assembly includes a skeleton and a plurality of fuel rods 1. The skeleton includes a top nozzle 4, a bottom nozzle 5, a plurality of spacer grids 2, a plurality of guide thimbles 3 and a instrument tube 6. The fuel rods 1 are inserted longitudinally into an organized array by the spacer grids 2 in such a manner as to be supported by means of springs (not shown) and dimples (not shown) which are formed in the spacer grids 2. In order to prevent the formation of scratches on the fuel rods 1 and damage to the springs upon assembling the nuclear fuel assembly, lacquer is applied to the surfaces of the fuel rods 1 before the fuel rods 1 are inserted longitudinally into the skeleton of the nuclear fuel assembly. Subsequently, the top and bottom nozzles are secured to the opposite ends of the nuclear fuel assembly, thereby finishing the procedure of assembly of the nuclear fuel assembly. After the lacquer is removed, the following items of the assembled nuclear fuel assembly are tested: the distance between the fuel rods, distortion, dimensions including the length, etc., thus completing the process of manufacturing the nuclear fuel assembly.

As shown in FIG. 2, the top nozzle 4 includes a hold-down plate 8, hold-down springs 43, inner-extension tubes 45, outer guide posts 44, and a flow plate 7.

Referring to FIGS. 1 and 2, the inner-extension tubes 45 of the top nozzle 4 are connected to the respective guide thimbles 3 so that the nuclear fuel assembly can be firmly fixed in the reactor and the structural stability of the nuclear fuel can be ensured during the burn-up of the nuclear fuel.

The top nozzle 4 and the guide thimbles 3 are joined to each other in such a way as to be removably connected to each other, thereby ensuring a path along which the fuel rods 1 can be drawn out when disassembling the top nozzle 4. Disassembly of the top nozzle 4 from the guide thimbles 3 is carried out in a storage tank. A worker must remotely perform the disassembly work to minimize the harm caused by radiation. Accordingly, the joint structure between the top nozzle 4 and the guide thimbles 3 must be designed such that assembly or disassembly between them can be conducted remotely.

FIGS. 2 and 3 illustrate a typical method of joining the guide thimbles 3 with the top nozzle 4. Referring to the drawings, the method of joining the guide thimbles 3 and the top nozzle 4 will be described. As shown in FIG. 2, an external thread is formed on a lower end 451 of each inner-extension tube 45. As shown in FIG. 3, an internal thread is formed on an inner surface of a threaded portion 31 of each guide thimble 3. The top nozzle 4 and the guide thimbles 3 are joined with each other by thread-coupling.

An external thread is formed on a lower end of each outer guide post 44. The outer guide posts 44 are threadedly coupled to the flow plate 7. The threaded lower end of each outer guide post 44 is partially welded to the flow plate 7 to prevent the outer guide post 44 from rotating. Furthermore, in order to prevent each inner-extension tube 45 from becoming loose, a head of the inner-extension tube 45 is partially crimped in a radial direction in such a way as to be put in contact with the outer guide post 44. Moreover, the inner-extension tube 45 can be separated from the outer guide post 44 only when torque of more than a specific strength is applied to the head.

However, in the state where the inner-extension tube 45 is joined with the outer guide post 44, when the inner-extension tube 45 of the top nozzle 4 is rotated to be separated from the outer guide post 44, since the distance between an outer surface of the inner-extension tube 45 and an inner surface of the outer guide post 44 is too short, it is difficult to rotate the inner-extension tube 45 along the threads if concentricity is not congruous or if foreign substances have gotten stuck between the outer face and the inner face. That is, due to frictional heat generated by the contact surface, the inner-extension tubes 45 and the outer guide posts 44, which are made of stainless steel, are fused together by a cold welding effect, and hence, loosening does not occur.

To solve the above-mentioned problems, there have been disclosed U.S. Pat. No. 4,702,883 entitled "Reconstitutable fuel assembly having removable upper stops on guide thimbles", and U.S. Pat. No. 4,687,630 entitled "Top nozzle and guide thimble joint structure in a nuclear fuel assembly".

In the prior arts, heads of outer guide posts are removed without any inner-extension tube, and processed to have threads so as to minimize the contact surface when the outer guide posts are removed. That is, thread-coupling portions are not only formed on an external threaded portion of a lower portion of each outer guide post and on an external threaded portion of a lower portion of each guide thimble, but also an additional thread-coupling portion is provided on an upper portion of the outer guide post.

Accordingly, when the head of each outer guide post is rotated to remove the top nozzle, since the outer guide post and the head thereof are threadedly-coupled with each other, the thread-coupling between the outer guide post and the guide thimble may become loosened. Hence, in order to prevent the lower end of the outer guide post from becoming loosened, the outer guide post is equipped with a wedge device; however, this has the problem of the assembling and disassembling processes being complicated.

Another conventional technique was proposed in Korean Patent Application No. 10-2007-0086066, which was filed by the applicant of the present invention and entitled "Joint structure between top nozzle and guide thimble for nuclear fuel assembly". This technique is provided with a structure for preventing an inner-extension tube from becoming loose when the top nozzle is disassembled. However, a threaded portion is disposed on an end of each of an inner-extension tube body and the inner-extension tube head, thus making it difficult to assemble them remotely. In other words, because the threaded portions must be coupled to each other without using an introduction portion that can serve as a guide, if two elements are not coaxially aligned with each other, the thread-coupling between the two elements may fail.

SUMMARY OF THE INVENTION

Accordingly, the present invention has been made keeping in mind the above problems occurring in the prior art, and an object of the present invention is to provide a joint structure between a top nozzle and a guide thimble which is configured such that when an inner-extension tube head that has been threadedly coupled to an inner-extension tube body is removed from the inner-extension tube body to disassemble the top nozzle, the inner-extension tube body can be prevented from being undesirably removed from the guide thimble, and in which the assembly or disassembly of the top nozzle of the nuclear fuel assembly which is carried out remotely to prevent exposure to radioactivity can be facilitated.

In order to accomplish the above object, the present invention provides a joint structure between a top nozzle provided on a flow plate and a guide thimble disposed under the flow plate, the joint structure including an outer guide post, an inner-extension tube head, an inner-extension tube body, a wedge and the guide thimble.

The outer guide post has a hollow cylindrical shape. An external thread is formed on a circumferential outer surface of a lower end of the outer guide post.

The inner-extension tube head includes an annular retaining part formed on an upper end of the inner-extension tube head by expanding an outer diameter thereof. An internal thread is formed on a circumferential inner surface of a medial portion of the inner-extension tube head.

The inner-extension tube body is provided with an external thread formed on a circumferential outer surface of each of upper and lower ends of the inner-extension tube body.

The wedge has a hollow cylindrical shape. At least one stop protrusion is provided under a lower end of the wedge. The stop protrusion extends a predetermined length in an axial direction of the wedge. The wedge is welded to the inner-extension tube body after the top nozzle has been joined with the guide thimble.

The guide thimble has a stop protrusion receiving depression formed in an upper end of the guide thimble. The stop protrusion receiving depression corresponds to a shape, number and position of the stop protrusion so that the stop protrusion is seated into the stop protrusion receiving depression.

At least one rotation-preventing surface may be formed on the inner-extension tube body above the external thread formed on the lower end of the inner-extension tube body. The rotation-preventing surface may be formed by cutting out a portion of the inner-extension tube body in a circumferential direction to form a planar shape. A rotation-preventing portion may be formed on a circumferential inner surface of a lower end of a flow hole of the flow plate. The rotation-preventing portion may have a space corresponding to a cross-sectional shape of the rotation-preventing surface.

A threaded-portion introducing part may be provided on a lower end of the inner-extension tube head. The threaded-portion introducing part may have an inner diameter greater than inner diameters of other portions of the inner-extension tube head. A threaded-portion guide part may be provided on an upper end of the inner-extension tube body. The threaded-portion guide part may have an outer diameter less than outer diameters of other portions of the inner-extension tube.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
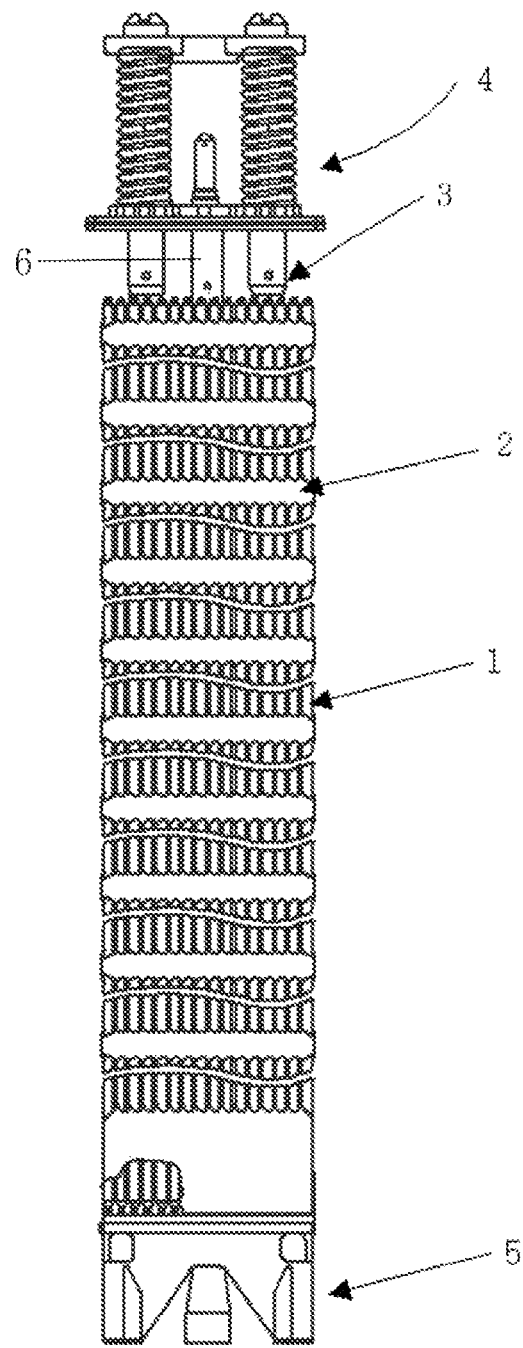
FIG. 1 is a schematic view of a conventional nuclear fuel assembly.

Hereinafter, a preferred embodiment of the present invention will be described in detail with reference to the attached drawings. Unless otherwise specifically stated, terms such as 'upper', 'lower', 'left' and 'right' to indicate directions will be used based on the orientation shown in the drawings.

The embodiment of the present invention basically includes an outer guide post 441, an inner-extension tube 450, a flow plate 700 and a guide thimble flange 300. The detailed description will be omitted of a hold-down plate and a hold-down spring, which are elements of a top nozzle but are not directly related to the structure that joins the outer guide post 441 and the inner-extension tube 450 to the guide thimble flange 300 through the flow plate 700.

Figure 4:
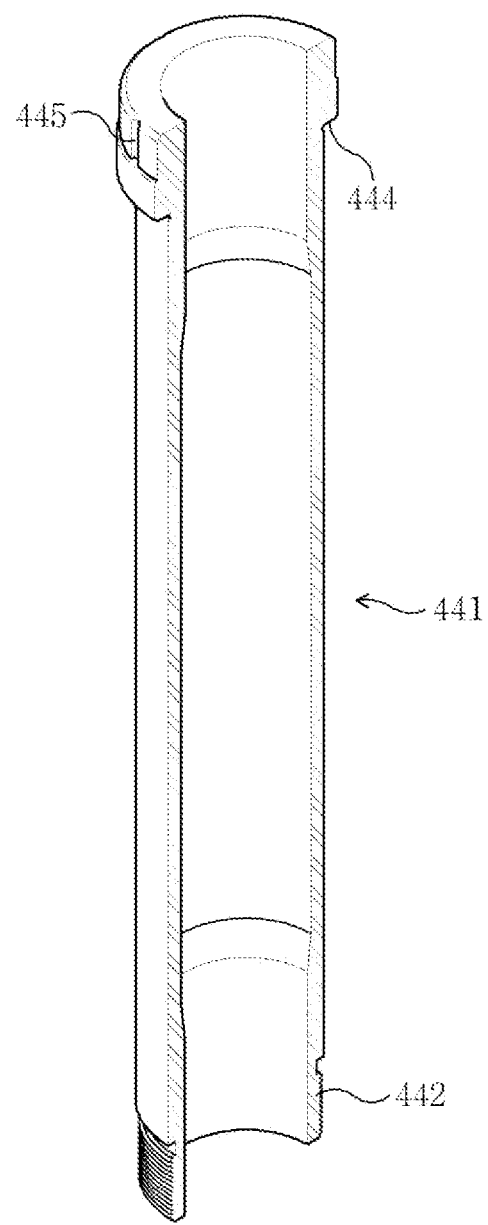
FIG. 4 is a perspective sectional view of an outer guide post according to the present invention.

First, the outer guide post 441 will be described with reference to FIG. 4.

The shape of the outer guide post 441 is that of a hollow cylinder that has open upper and lower ends. An external thread 442 is formed on a circumferential outer surface of a lower end of the outer guide post 441 and is used to couple the outer guide post 441 to the flow plate 700.

Figure 2:
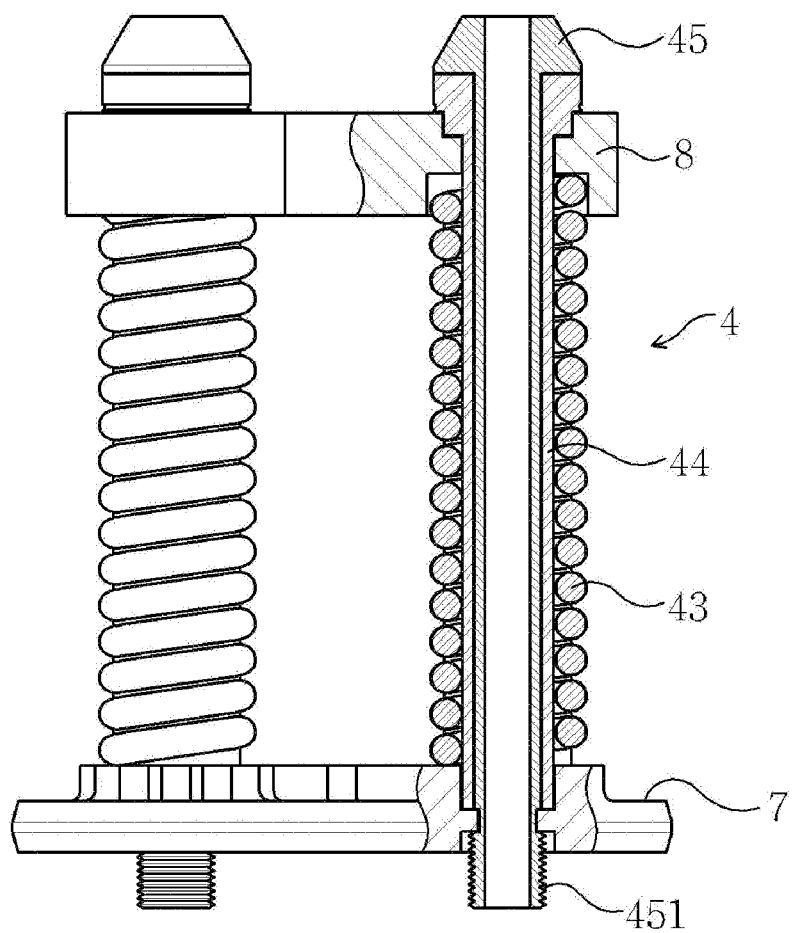
FIG. 2 is a partially sectional view of a conventional top nozzle.
Figure 3:
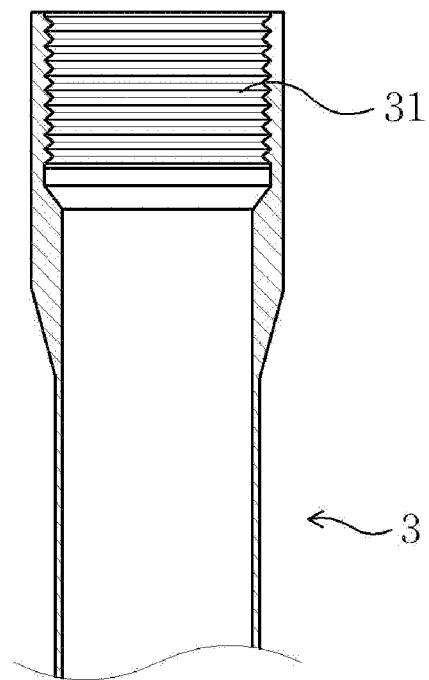
FIG. 3 is a sectional view of a conventional guide thimble.

A large-diameter part, the diameter of which is larger than other portions of the outer guide post 441, is provided on an upper end of the outer guide post 441. An annular retaining part 444 is formed by this difference in diameter so that, as shown in FIG. 2, the hold-down plate 8 is stopped by the annular retaining part 444, thereby restricting extension of the spring 43.

Crimping grooves 445 are formed in a circumferential outer surface of the upper end of the outer guide post 441 at positions spaced apart from each other along the circumferential direction at regular intervals. Each crimping groove 445 is a groove which extends for a predetermined length. The detailed use of the crimping grooves 445 will be explained in detailed in the following description of the inner-extension tube 450.

The inner-extension tube 450 will be described with reference to FIG. 5. The inner-extension tube 450 includes an inner-extension tube body 451 and an inner-extension tube head 456.

The inner-extension tube head 456 has a hollow cylindrical shape and is coupled to an upper end of the inner-extension tube body 451.

An annular retaining part 459 is formed on an upper end of the inner-extension tube head 456. The diameter of the annular retaining part 459 is larger than other portions of the inner-extension tube head 456 so that when the inner-extension tube head 456 is coupled to the inner-extension tube body 451 and then inserted into the outer guide post 441, the inner-extension tube head 456 can be prevented from being totally inserted thereinto.

An internal thread 458 is formed on a circumferential inner surface of a medial portion of the inner-extension tube head 456. The internal thread 458 engages with an external thread 452 which is formed on an upper end of the inner-extension tube body 451 which will be explained later herein.

A threaded-portion introducing part 457 is formed in a lower end of the inner-extension tube head 456. The inner diameter of the threaded-portion introducing part 457 is greater than other portions of the inner-extension tube head 456 so that when the inner-extension tube head 456 is joined with the inner-extension tube body 451, the upper end of the inner-extension tube body 451 can be more easily inserted into the inner-extension tube head 456.

Furthermore, a crimping film 460 is provided under an outer edge of the annular retaining part 459 provided on the inner-extension tube head 456. The crimping film 460 is spaced apart from the body of the inner-extension tube head 456 by a predetermined distance so that a space is defined therebetween. When the inner-extension tube 450 is fitted into the outer guide post 441, a predetermined portion of the crimping film 460 is crimped into the crimping groove 445 (refer to FIG. 4), thus preventing the thread-coupling between the elements from becoming loose.

The inner-extension tube body 451 is a hollow cylinder which is longer than the outer guide post 441 and is open on upper and lower ends thereof in the same manner as that of the outer guide post 441. The inner-extension tube body 451 is joined with the inner-extension tube head 456 and inserted into the outer guide post 441. Hence, the outer diameter of the inner-extension tube body 451 must be equal to or less than the inner diameter of the outer guide post 441.

A threaded-portion guide part 453 is provided on the upper end of the inner-extension tube body 451. The threaded-portion guide part 453 guides the insertion of the inner-extension tube body 451 into the threaded-portion introducing part 457 provided in the inner-extension tube head 456, so that a process of engaging the external thread 452 formed on the inner-extension tube body 451 with the internal thread 458 of the inner-extension tube head 456 can be easily carried out remotely.

A lower external thread 454 is formed on a circumferential outer surface of a lower end of the inner-extension tube body 451. The lower external thread 454 is used to join the inner-extension tube body 451 with the guide thimble flange 300 which will be explained later herein. Here, when the inner-extension tube body 451 that has been joined with the inner-extension tube head 456 is inserted into the outer guide post 441, the lower external thread 454 protrudes downwards from the lower end of the outer guide post 441 to allow it to engage with the guide thimble flange 300.

Figure 5:
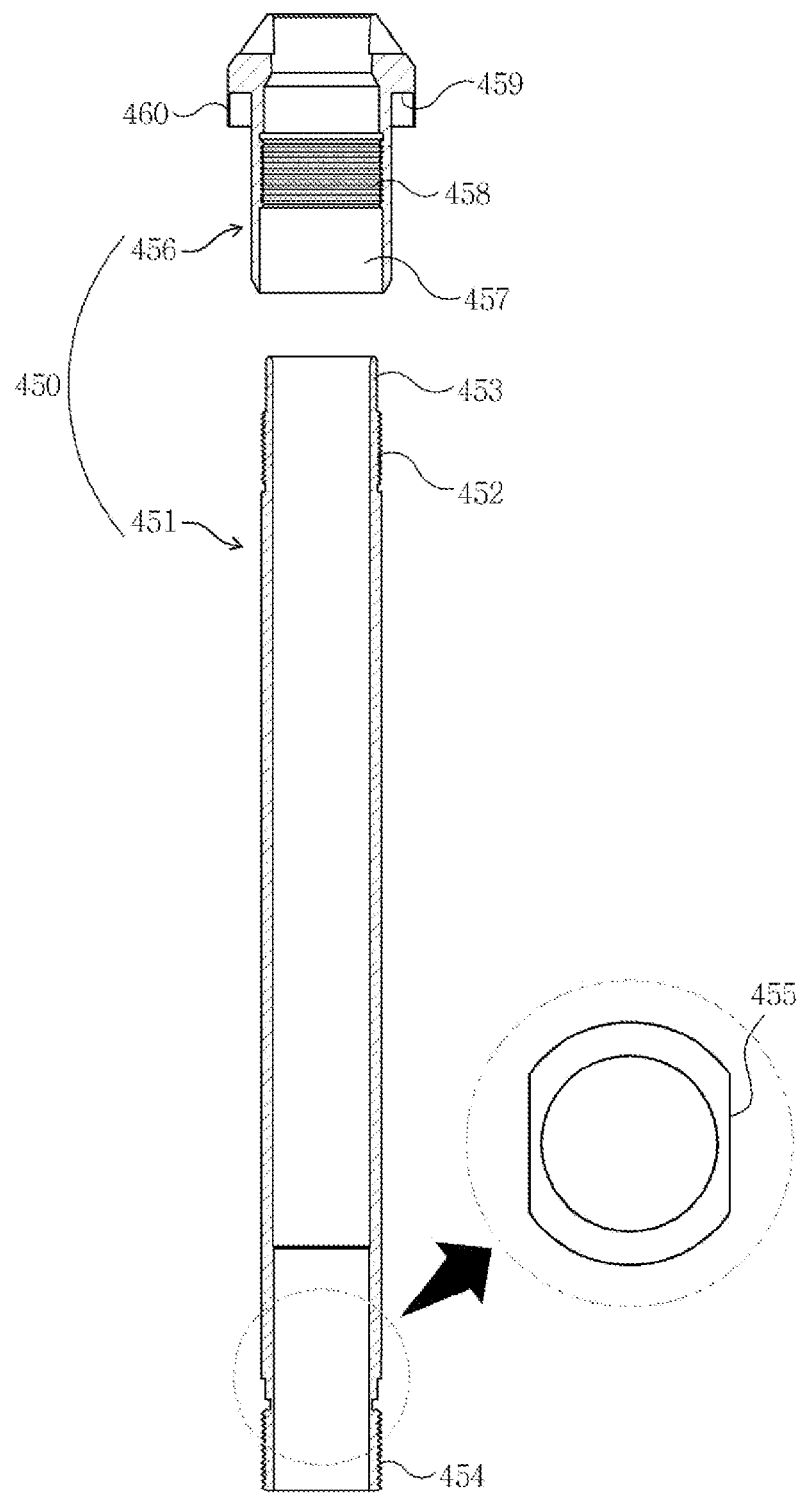
FIG. 5 is a sectional view of an inner-extension tube according to the present invention.
Figure 8:
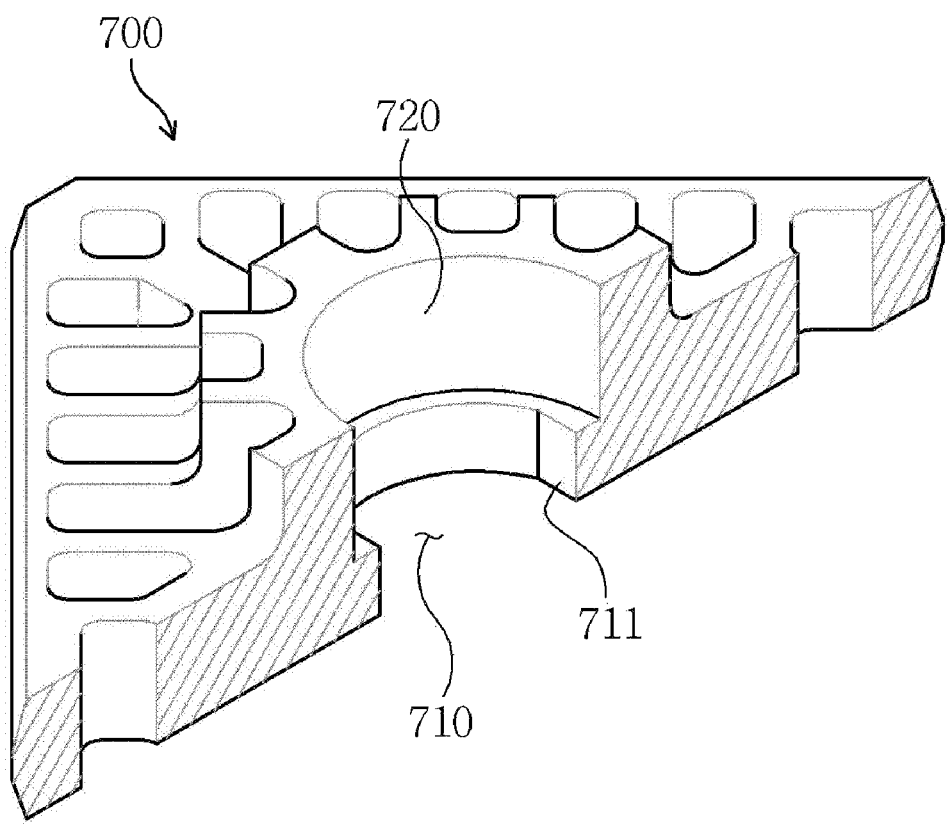
FIG. 8 is a perspective sectional view showing a portion of a flow plate according to the present invention.

As shown in an enlarged circle portion of FIG. 5, a rotation-preventing surface 455 is formed on the lower portion of the inner-extension tube body 451. The rotation-preventing surface 455 is a planar surface which is formed in the circumferential direction by cutting out a portion of an annular flange-shaped part. The rotation-preventing surface 455 increases the area of contact between it and a tool so that rotational force can be reliably transmitted from the tool to the inner-extension tube body 451. The rotation-preventing surface 455, along with a rotation-preventing portion 711 (refer to FIG. 8), functions to prevent the inner-extension tube 450 from undesirably rotating. This will be explained in more detail in the description of the construction of the flow plate 700.

Figure 6:
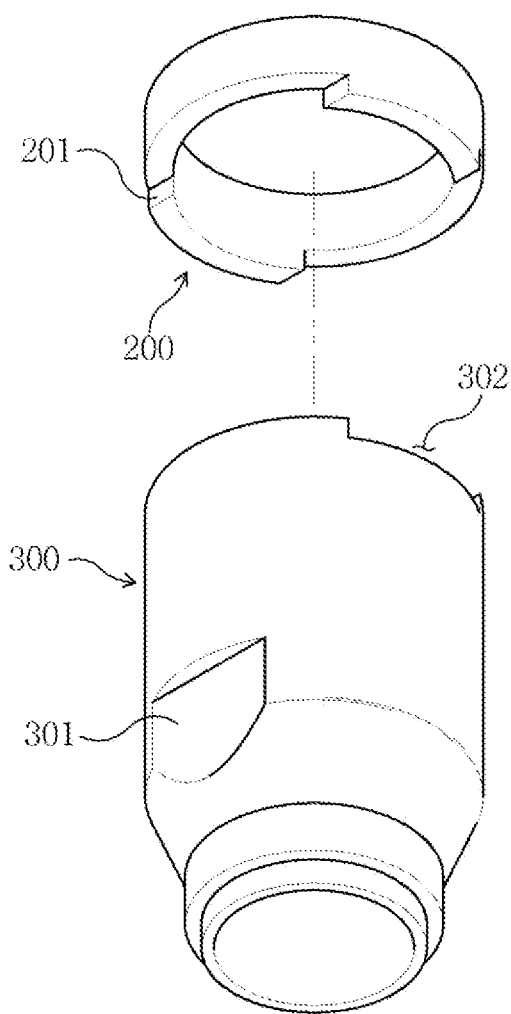
FIG. 6 is a perspective view illustrating a wedge and a guide thimble flange according to the present invention.

Hereinafter, the guide thimble flange will be described with reference to FIG. 6.

The guide thimble flange of the embodiment of the present invention is provided with a wedge 200.

The wedge 200 is a hollow cylinder which is short in the axial direction. A stop protrusion 201 is provided under a lower end of the wedge 200. The stop protrusion 201 is formed in such a way that a portion protrudes from the lower end of the wedge 200 such that it is longer than the other portion of the wedge 200. The number of stop protrusions 201 may be more than one. Given the ease of manufacturing or durability, it is preferable that one or two stop protrusions 201 be provided. The material of the wedge 200 is the same as that of the inner-extension tube body 451 so that the wedge 200 can be easily welded to the inner-extension tube body 451 after the guide thimble flange 300 has been joined with the inner-extension tube body 451. After the wedge 200 has been welded to the inner-extension tube body 451, the wedge 200 can fulfill its function of preventing the inner-extension tube body 451 from undesirably rotating when the inner-extension tube head 456 is rotated in a direction opposite to the direction in which the thread is tightened and becomes loosened from the inner-extension tube body 451.

Furthermore, a tool contact portion 301 is formed in a circumferential outer surface of the guide thimble flange 300. The tool contact portion 301 increases its ability to make contact with a tool so that the rotational force of the tool can be efficiently transmitted to the guide thimble flange 300 without slipping with respect to the guide thimble flange 300.

Figure 9:
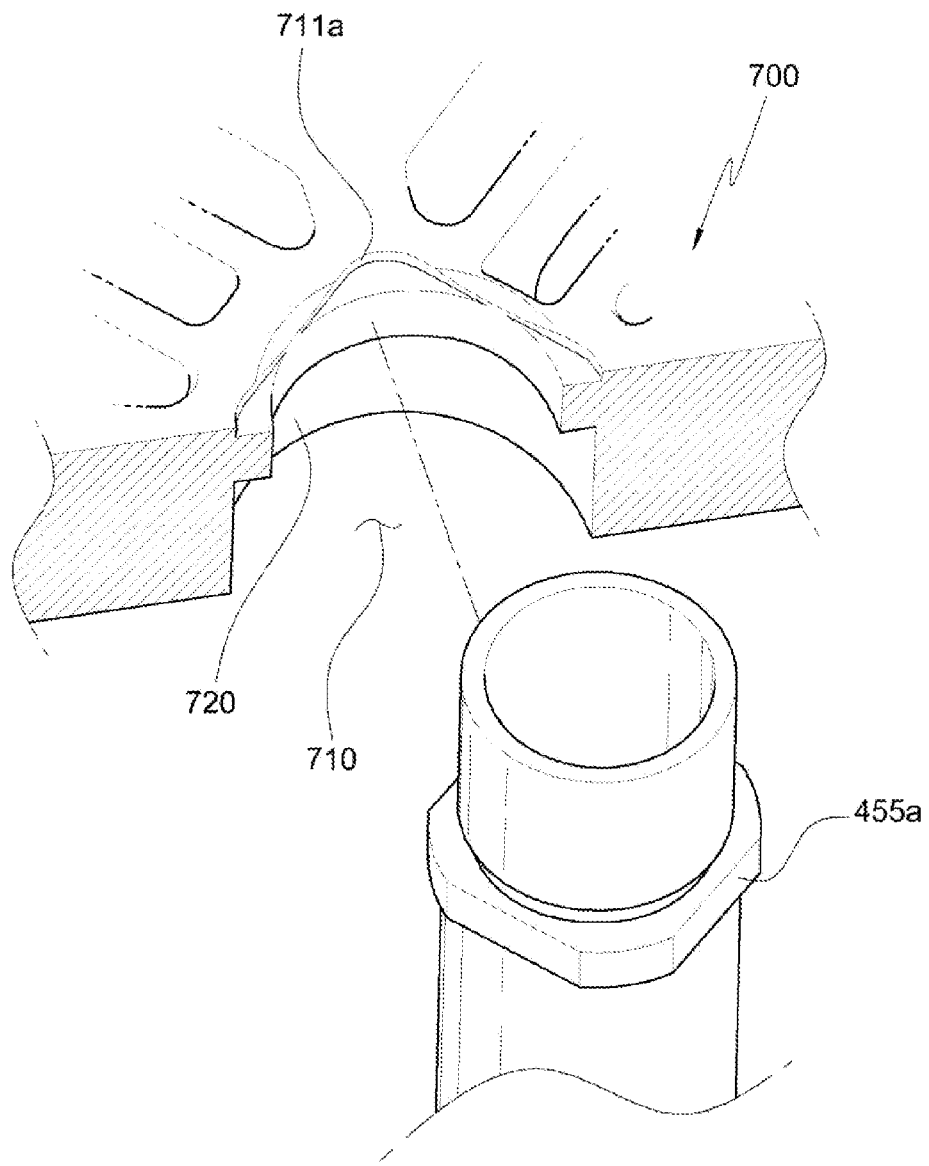
FIG. 9 is an upside-down perspective view showing a rotation-preventing surface of the inner-extension tube and a flow plate corresponding thereto, according to the present invention.

The structure of the flow plate of the embodiment of the present invention is almost the same as that of the conventional flow plate. However, unlike the conventional flow plate, as stated above, the flow plate of the present invention includes the rotation-preventing portion 711 which has a cross-sectional shape corresponding to that of the rotation-preventing surface 455, so that when the inner-extension tube body 451 is joined with the flow plate 700, the rotation-preventing surface 455 is put into close contact with the rotation-preventing portion 711, thus preventing the inner-extension tube 450 from undesirably rotating. The present invention is not limited to this rotation-preventing structure. FIG. 9 illustrates another example of the rotation-preventing structure. As show in FIG. 9, the number of rotation-preventing surfaces 455*a* can be determined arbitrarily. Also, a rotation-preventing portion 711*a* has an inner surface corresponding to the shape of the rotation-preventing surfaces 455*a*.

Figure 7:
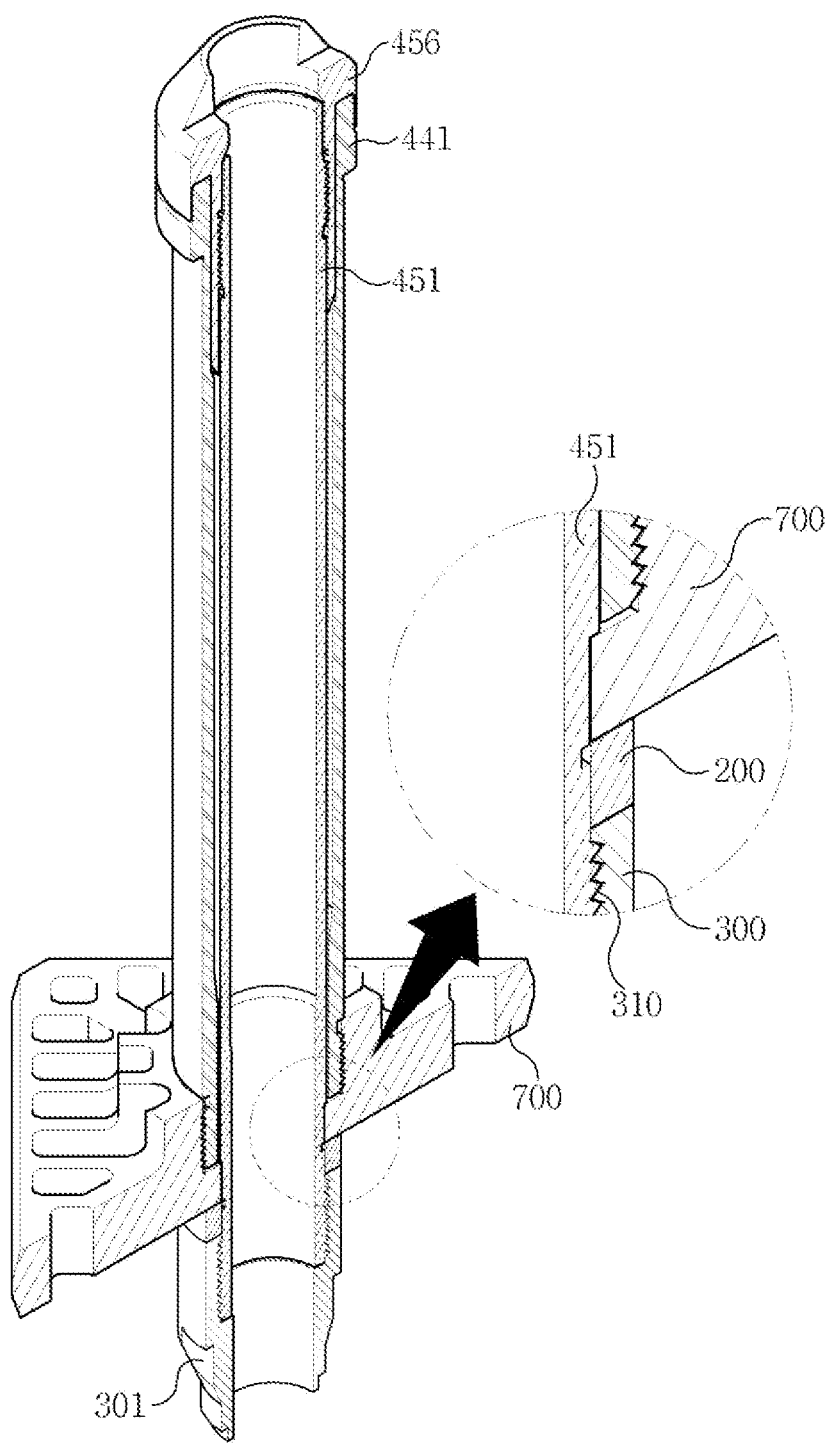
FIG. 7 is a perspective sectional view showing the joining of a top nozzle to a guide thimble according to the present invention.

Hereinafter, the operation and effect of the embodiment of the present invention will be described with reference to FIG. 7. FIG. 7 illustrates the joint structure among the outer guide post 441, the inner-extension tube body 451, the inner-extension tube head 456, the flow plate 700 and the guide thimble flange 300.

First, a process of assembling the embodiment of the present invention will be explained.

The outer guide post 441 is joined with the hold-down spring (not shown) and the flow plate 700. The wedge 200 is disposed between the inner-extension tube body 451 and the guide thimble flange 300, and then the guide thimble flange 300 is threadedly coupled to the inner-extension tube body 451. Subsequently, the wedge 200 is welded to the inner-extension tube body 451. The inner-extension tube body 451, which has been joined with the guide thimble flange 300 and to which the wedge 200 is welded, is inserted into the outer guide post 441. Thereafter, the inner-extension tube head 456 is coupled to the inner-extension tube body 451, thus completing the assembly.

A process of disassembling the joint structure of the present invention is conducted in the reverse order of the above-mentioned assembly.

First, the inner-extension tube head 456 is rotated and removed from the inner-extension tube body 451. Subsequently, the integrated top nozzle, which includes the outer guide post 441, the flow plate 700, the hold-down spring (not shown) and the hold-down plate (not shown), is separated from the nuclear fuel assembly.

In the disassembly process, in detail, when the inner-extension tube head 456 is separated from the inner-extension tube body 451, there is a likelihood of the lower thread 454 of the inner-extension tube body 451 becoming undesirably loosened from the internal thread 310 of the guide thimble. However, in the present invention, because the stop protrusion 201 provided on the wedge 200 which is welded to the inner-extension tube body 451 is blocked in a stop protrusion receiving depression 302 formed in the upper end of the guide thimble flange 300, the inner-extension tube body 451 can be prevented from becoming loosened from the guide thimble flange 300.

As described above, in the present invention, a threaded portion guide is formed in each of an inner-extension tube head and an inner-extension tube body, thus making it easy to carry out the assembly or disassembly remotely.

Furthermore, in the present invention, a wedge is provided between an inner-extension tube of a top nozzle and a guide thimble, so that when the integrated top nozzle is separated from the guide thimble, rotation of an inner-extension tube head can be prevented from causing an inner-extension tube to become loosened from the guide thimble.

Moreover, an area of a contact portion between elements that rotate can be minimized. The assembly or disassembly of the top nozzle can be facilitated, thus reducing the time required to assemble or disassemble it.

Although the preferred embodiment of the present invention has been disclosed for illustrative purposes, those skilled in the art will appreciate that various modifications, additions and substitutions of the joint structure between the top nozzle and the guide thimble are possible, without departing from the scope and spirit of the invention as disclosed in the accompanying claims.

What is claimed is:

1. A joining structure for joining a top nozzle and a guide thimble, the joining structure comprising:
    an outer guide post having a hollow cylindrical shape and an external thread formed on an outer circumferential surface of a lower end portion of the outer guide post;
    an inner-extension tube head comprising
        an annular retaining part formed on an upper end portion of the inner-extension tube head and having an outer diameter greater than that of other portion of the inner extension tube head, and
        an internal thread formed on an inner circumferential surface of a medial portion of the inner-extension tube head;
    an inner-extension tube body having a hollow cylindrical shape and including
        a first external thread formed on an outer circumferential surface of an upper portion of the inner-extension tube body, and
        a second external thread formed on the outer circumferential surface of a lower end portion of the inner-extension tube body; and
    a wedge having a hollow cylindrical shape and including at least one stop protrusion formed on a bottom surface of the wedge, the stop protrusion extending a predetermined length in an axial direction of the wedge, the wedge being separated from the inner-extension tube body and the outer guide post,
    wherein the inner-extension tube body is coaxially inserted into the outer guide post,
    the inner-extension tube head is mounted on a top of the outer guide post, the first external thread of the inner-extension tube body is engaged with the internal thread of the inner-extension tube head,
    the second external thread of the inner-extension tube body is engaged with an internal thread of the guide thimble, and
    the wedge is mounted on the outer circumferential surface of the inner-extension tube body and disposed between a bottom end of the outer guide post and the guide thimble.

2. The joining structure as set forth in claim 1, wherein the inner-extension tube body further includes
    at least one rotation-preventing surface formed on the outer circumferential surface of the inner-extension tube body adjacently with the second external thread, the rotation-preventing surface being formed by cutting out a portion of the inner-extension tube body in a circumferential direction to form a planar shape.

3. The joining structure as set forth in claim 1, wherein the inner-extension tube head further includes a threaded-portion introducing part provided on a lower portion of the inner-extension tube head, the threaded-portion introducing part having an inner diameter greater than inner diameters of other portions of the inner-extension tube head, and wherein the inner-extension tube body further includes a threaded-portion guide part provided on an upper end portion of the inner-extension tube body, the threaded-portion guide part having an outer diameter less than outer diameters of other portions of the inner-extension tube.

4. The joining structure as set forth in claim 2, wherein the inner-extension tube head further includes a threaded-portion introducing part provided on a lower portion of the inner-extension tube head, the threaded-portion introducing part having an inner diameter greater than inner diameters of other portions of the inner-extension tube head, and wherein the inner-extension tube body further includes a threaded-portion guide part provided on an upper end portion of the inner-extension tube body, the threaded-portion guide part having an outer diameter less than outer diameters of other portions of the inner-extension tube.

\* \* \* \* \*